United States Patent
Wang

(10) Patent No.: US 9,749,509 B2
(45) Date of Patent: Aug. 29, 2017

(54) CAMERA WITH LENS FOR VEHICLE VISION SYSTEM

(71) Applicant: MAGNA ELECTRONICS INC., Auburn Hills, MI (US)

(72) Inventor: Jianguo Wang, Troy, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 204 days.

(21) Appl. No.: 14/645,546

(22) Filed: Mar. 12, 2015

(65) Prior Publication Data

US 2015/0264234 A1   Sep. 17, 2015

Related U.S. Application Data

(60) Provisional application No. 61/952,335, filed on Mar. 13, 2014.

(51) Int. Cl.
  *H04N 5/20* (2006.01)
  *G03B 17/12* (2006.01)
  *H04N 5/225* (2006.01)

(52) U.S. Cl.
  CPC ........... *H04N 5/2254* (2013.01); *G03B 17/12* (2013.01); *H04N 5/2257* (2013.01)

(58) Field of Classification Search
  None
  See application file for complete search history.

(56) References Cited

U.S. PATENT DOCUMENTS

| 4,712,879 A | 12/1987 | Lynam et al. |
| 4,786,966 A | 11/1988 | Hanson et al. |
| 5,073,012 A | 12/1991 | Lynam |
| 5,076,673 A | 12/1991 | Lynam et al. |
| 5,115,346 A | 5/1992 | Lynam |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,253,109 A | 10/1993 | O'Farrell et al. |
| 5,371,659 A | 12/1994 | Pastrick |
| 5,406,414 A | 4/1995 | O'Farrell |
| 5,497,306 A | 3/1996 | Pastrick |

(Continued)

FOREIGN PATENT DOCUMENTS

| CN | 1743887 | 3/2006 |
| EP | 1271214 | 1/2003 |

(Continued)

*Primary Examiner* — Reza Aghevli
(74) *Attorney, Agent, or Firm* — Gardner, Linn, Burkhart & Flory, LLP

(57) ABSTRACT

A camera assembly for a vehicle vision system includes an imager, a lens and a lens holder. The imager is disposed at a circuit element. The lens holder includes a barrel portion that houses the lens. The lens holder is positioned relative to the imager and includes a flange protruding outward from the barrel portion. The flange of the lens holder includes a generally flat structure having a planar surface that resides in a plane that is normal to an axis of the barrel portion. The lens holder is positioned relative to the imager such that the plane is parallel to the image plane and such that the planar flat surface is a predetermined distance from the image plane, thereby positioning the lens at a desired location relative to the imager.

20 Claims, 5 Drawing Sheets

(56) References Cited

U.S. PATENT DOCUMENTS

| | | |
|---|---|---|
| 5,525,264 A | 6/1996 | Cronin et al. |
| 5,550,677 A | 8/1996 | Schofield et al. |
| 5,559,556 A | 9/1996 | Kagebeck |
| 5,567,360 A | 10/1996 | Varaprasad et al. |
| 5,610,756 A | 3/1997 | Lynam et al. |
| 5,668,663 A | 9/1997 | Varaprasad et al. |
| 5,669,699 A | 9/1997 | Pastrick et al. |
| 5,670,935 A | 9/1997 | Schofield et al. |
| 5,724,187 A | 3/1998 | Varaprasad et al. |
| 5,760,962 A | 6/1998 | Schofield et al. |
| 5,796,094 A | 8/1998 | Schofield et al. |
| 5,821,532 A | 10/1998 | Beaman et al. |
| 5,823,654 A | 10/1998 | Pastrick et al. |
| 5,854,708 A | 12/1998 | Komatsu et al. |
| 5,872,332 A | 2/1999 | Verma |
| 5,877,897 A | 3/1999 | Schofield et al. |
| 5,910,854 A | 6/1999 | Varaprasad et al. |
| 5,949,331 A | 9/1999 | Schofield et al. |
| 5,978,017 A | 11/1999 | Tino |
| 6,002,544 A | 12/1999 | Yatsu |
| 6,013,372 A | 1/2000 | Hayakawa et al. |
| 6,071,606 A | 6/2000 | Yamazaki et al. |
| 6,072,814 A | 6/2000 | Ryan et al. |
| 6,097,023 A | 8/2000 | Schofield et al. |
| 6,117,193 A | 9/2000 | Glenn |
| 6,151,065 A | 11/2000 | Steed et al. |
| 6,154,306 A | 11/2000 | Varaprasad et al. |
| 6,176,602 B1 | 1/2001 | Pastrick et al. |
| 6,178,034 B1 | 1/2001 | Allemand et al. |
| 6,193,378 B1 | 2/2001 | Tonar et al. |
| 6,201,642 B1 | 3/2001 | Bos |
| 6,222,447 B1 | 4/2001 | Schofield et al. |
| 6,259,475 B1 | 7/2001 | Ramachandran et al. |
| 6,276,821 B1 | 8/2001 | Pastrick et al. |
| 6,292,311 B1 | 9/2001 | Bohn et al. |
| 6,302,545 B1 | 10/2001 | Schofield et al. |
| 6,320,176 B1 | 11/2001 | Schofield et al. |
| 6,353,392 B1 | 3/2002 | Schofield et al. |
| 6,396,397 B1 | 5/2002 | Bos et al. |
| 6,454,449 B2 | 9/2002 | Nestell et al. |
| 6,481,003 B1 | 11/2002 | Maeda |
| 6,483,101 B1 | 11/2002 | Webster |
| 6,498,620 B2 | 12/2002 | Schofield et al. |
| 6,523,964 B2 | 2/2003 | Schofield et al. |
| 6,535,242 B1 | 3/2003 | Strumolo et al. |
| 6,559,435 B2 | 5/2003 | Schofield et al. |
| 6,559,439 B1 | 5/2003 | Tsuchida et al. |
| 6,590,658 B2 | 7/2003 | Case et al. |
| 6,603,612 B2 | 8/2003 | Nakano |
| 6,611,202 B2 | 8/2003 | Schofield et al. |
| 6,651,187 B2 | 11/2003 | Lacey, III |
| 6,654,187 B2 | 11/2003 | Ning |
| 6,690,268 B2 | 2/2004 | Schofield et al. |
| 6,717,610 B1 | 4/2004 | Bos et al. |
| 6,757,109 B2 | 6/2004 | Bos |
| 6,805,767 B2 | 10/2004 | Shinomiya |
| 6,806,452 B2 | 10/2004 | Bos et al. |
| 6,822,563 B2 | 11/2004 | Bos et al. |
| 6,831,261 B2 | 12/2004 | Schofield et al. |
| 6,891,563 B2 | 5/2005 | Schofield et al. |
| 6,897,432 B2 | 5/2005 | Schmidtke et al. |
| 6,946,978 B2 | 9/2005 | Schofield |
| 6,977,619 B2 | 12/2005 | March et al. |
| 7,004,606 B2 | 2/2006 | Schofield |
| 7,005,974 B2 | 2/2006 | McMahon et al. |
| 7,015,944 B2 | 3/2006 | Holz et al. |
| 7,031,075 B2 | 4/2006 | Tsuji |
| 7,038,577 B2 | 5/2006 | Pawlicki et al. |
| 7,095,123 B2 | 8/2006 | Prior |
| 7,095,572 B2 | 8/2006 | Lee et al. |
| 7,123,168 B2 | 10/2006 | Schofield |
| 7,215,479 B1 | 5/2007 | Bakin |
| 7,255,451 B2 | 8/2007 | McCabe et al. |
| 7,268,957 B2 | 9/2007 | Frenzel et al. |
| 7,339,149 B1 | 3/2008 | Schofield et al. |
| 7,370,983 B2 | 5/2008 | DeWind et al. |
| 7,391,458 B2 | 6/2008 | Sakamoto |
| 7,419,315 B2 | 9/2008 | Hirata et al. |
| 7,423,665 B2 | 9/2008 | Ray et al. |
| 7,453,509 B2 | 11/2008 | Losehand et al. |
| 7,599,134 B2 | 10/2009 | Bechtel et al. |
| 7,768,574 B2 | 8/2010 | Humpston |
| 7,965,336 B2 | 6/2011 | Bingle et al. |
| 8,064,146 B2 | 11/2011 | Iwasaki |
| 8,120,652 B2 | 2/2012 | Bechtel et al. |
| 8,318,512 B2 | 11/2012 | Shah et al. |
| 8,542,451 B2 | 9/2013 | Lu et al. |
| 9,029,759 B2 * | 5/2015 | Singh ............... H01L 27/14618 250/208.1 |
| 9,106,819 B1 * | 8/2015 | Gao ..................... H04N 5/2254 |
| 9,277,104 B2 | 3/2016 | Sesti et al. |
| 9,338,334 B2 | 5/2016 | Lu et al. |
| 2002/0159270 A1 | 10/2002 | Lynam et al. |
| 2003/0090569 A1 | 5/2003 | Poechmueller |
| 2003/0137595 A1 | 7/2003 | Takachi |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2005/0104995 A1 | 5/2005 | Spryshak et al. |
| 2005/0190283 A1 | 9/2005 | Ish-Shalom et al. |
| 2005/0232469 A1 | 10/2005 | Schofield et al. |
| 2005/0274883 A1 | 12/2005 | Nagano |
| 2006/0038668 A1 | 2/2006 | DeWard et al. |
| 2006/0049533 A1 | 3/2006 | Kamoshita |
| 2006/0050018 A1 | 3/2006 | Hutzel et al. |
| 2006/0054802 A1 | 3/2006 | Johnston |
| 2006/0056077 A1 | 3/2006 | Johnston |
| 2006/0061008 A1 | 3/2006 | Karner et al. |
| 2006/0065436 A1 | 3/2006 | Gally et al. |
| 2006/0077575 A1 * | 4/2006 | Nakai ............... B29C 65/1664 359/819 |
| 2006/0125919 A1 | 6/2006 | Camilleri et al. |
| 2006/0171704 A1 | 8/2006 | Bingle et al. |
| 2006/0184297 A1 | 8/2006 | Higgins-Luthman |
| 2007/0279518 A1 | 12/2007 | Apel et al. |
| 2008/0024883 A1 | 1/2008 | Iwasaki |
| 2008/0043105 A1 | 2/2008 | Kallhammer et al. |
| 2009/0010494 A1 | 1/2009 | Bechtel et al. |
| 2009/0244361 A1 | 10/2009 | Gebauer et al. |
| 2010/0039713 A1 * | 2/2010 | Lusinchi ............... G02B 13/001 359/819 |
| 2010/0279439 A1 | 11/2010 | Shah et al. |
| 2010/0315546 A1 * | 12/2010 | Saito ............... H01L 27/14618 348/374 |
| 2011/0298968 A1 | 12/2011 | Tseng et al. |
| 2014/0022657 A1 | 1/2014 | Lu et al. |
| 2014/0298642 A1 * | 10/2014 | Sesti ..................... G02B 7/025 29/592.1 |
| 2015/0124098 A1 | 5/2015 | Winden et al. |

FOREIGN PATENT DOCUMENTS

| | | | |
|---|---|---|---|
| EP | 1351316 | 10/2003 | |
| EP | 1605520 | 12/2005 | |
| JP | 08-084277 | 3/1996 | |
| JP | 2006-293100 | 10/2006 | |
| JP | 2006-350372 | 12/2006 | |
| WO | WO 01/44850 | 6/2001 | |
| WO | WO 2004/010679 | 1/2004 | |
| WO | WO 2006/029995 | 3/2006 | |
| WO | WO 2006/029996 | 3/2006 | |
| WO | WO 2010/111465 | * 9/2010 | ............... G02B 7/02 |
| WO | WO 2013/063014 | * 5/2013 | ............. B32B 37/12 |

* cited by examiner

CAMERA WITH LENS FOR VEHICLE VISION SYSTEM

CROSS REFERENCE TO RELATED APPLICATION

The present application is related to U.S. provisional application Ser. No. 61/952,335, filed Mar. 13, 2014, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle. The camera or camera module includes an imager (such as an imaging array of photosensing pixels established at or disposed at a circuit board or element) and a lens that focuses or at least substantially focuses images at the image plane of the imager. The lens is held in a lens holder or barrel, which is mounted at the camera (such as at a front housing portion of the camera module) and relative to the imager so as to provide focusing of images at the image plane. The lens holder includes a generally planar or flat structure that is formed to have a flat surface at a known location relative to the lens, so that, when the camera module is assembled, the lens holder is positioned with the flat structure a predetermined distance to the image plane of the imager so that the lens focuses the images at the imager. The generally flat structure is formed (such as by molding the generally flat structure with the lens holder and flange during an injection molding process) to provide a flat or planar surface that resides in a plane that is normal to an axis of the lens and that, when the lens holder is positioned at the imager, is parallel to the image plane of the imager.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
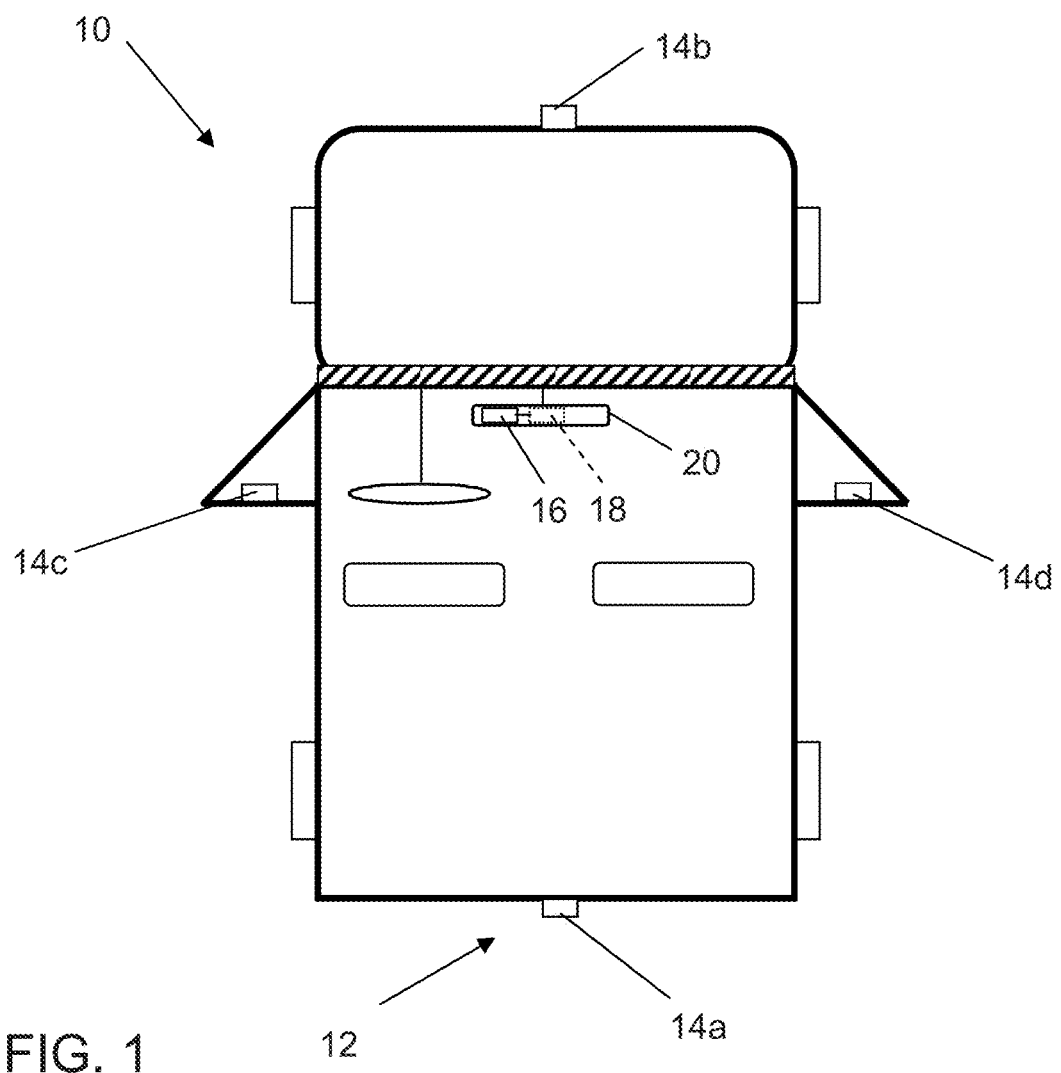
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 3:
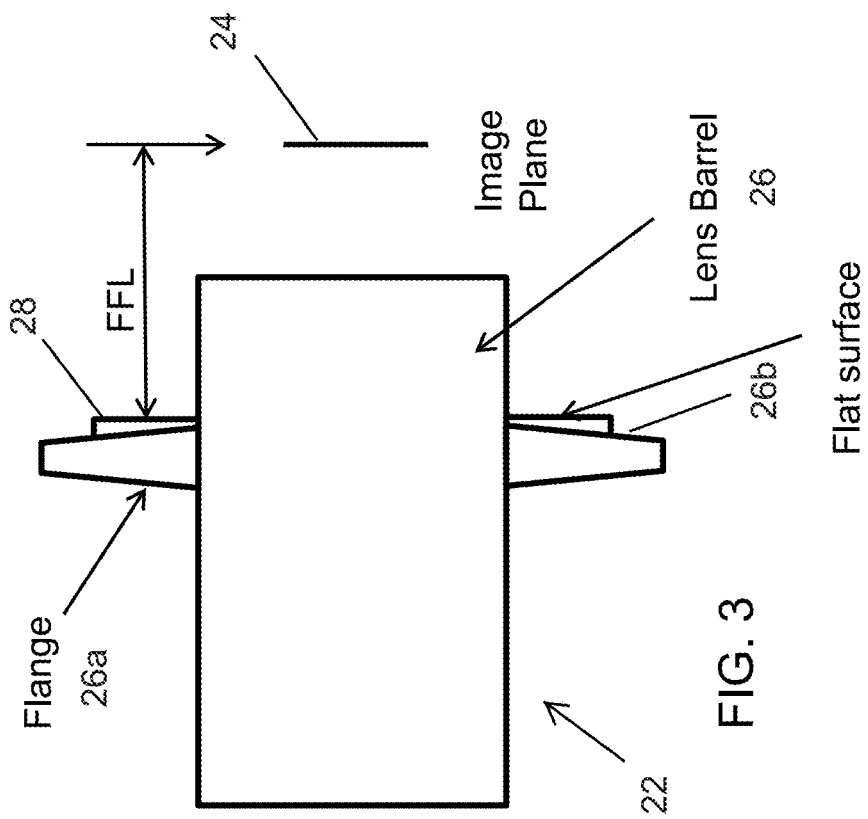
FIG. 3 is a side elevation and partial sectional view of the lens holder of FIG. 2.
Figure 2:
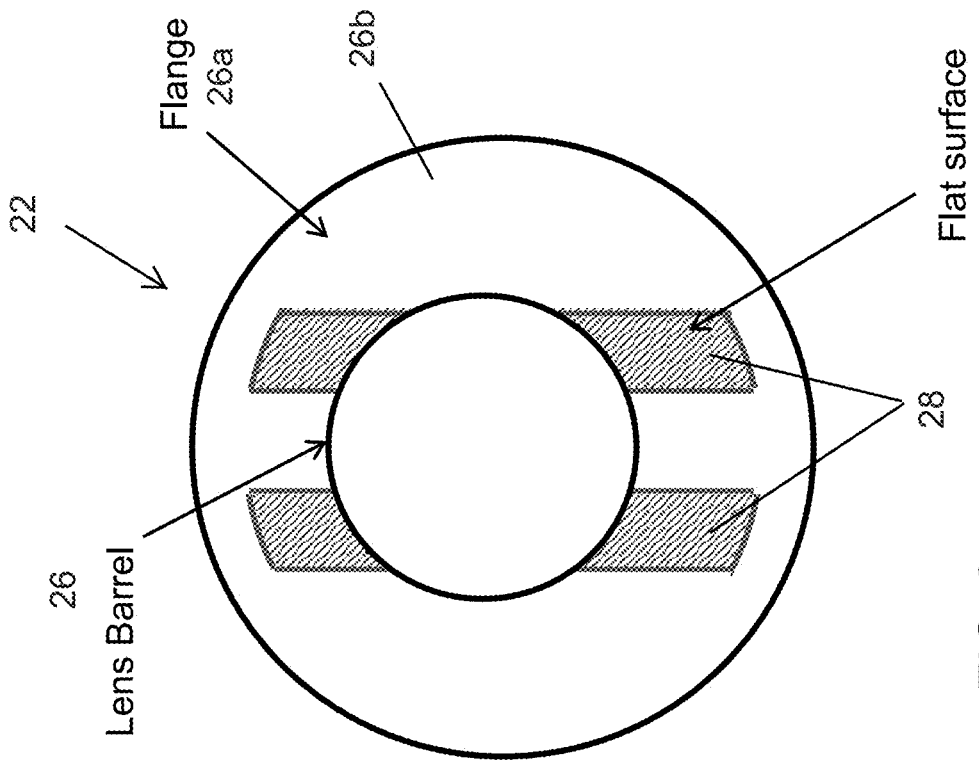
FIG. 2 is an end view of a lens holder of the camera of the present invention.
Figure 4:
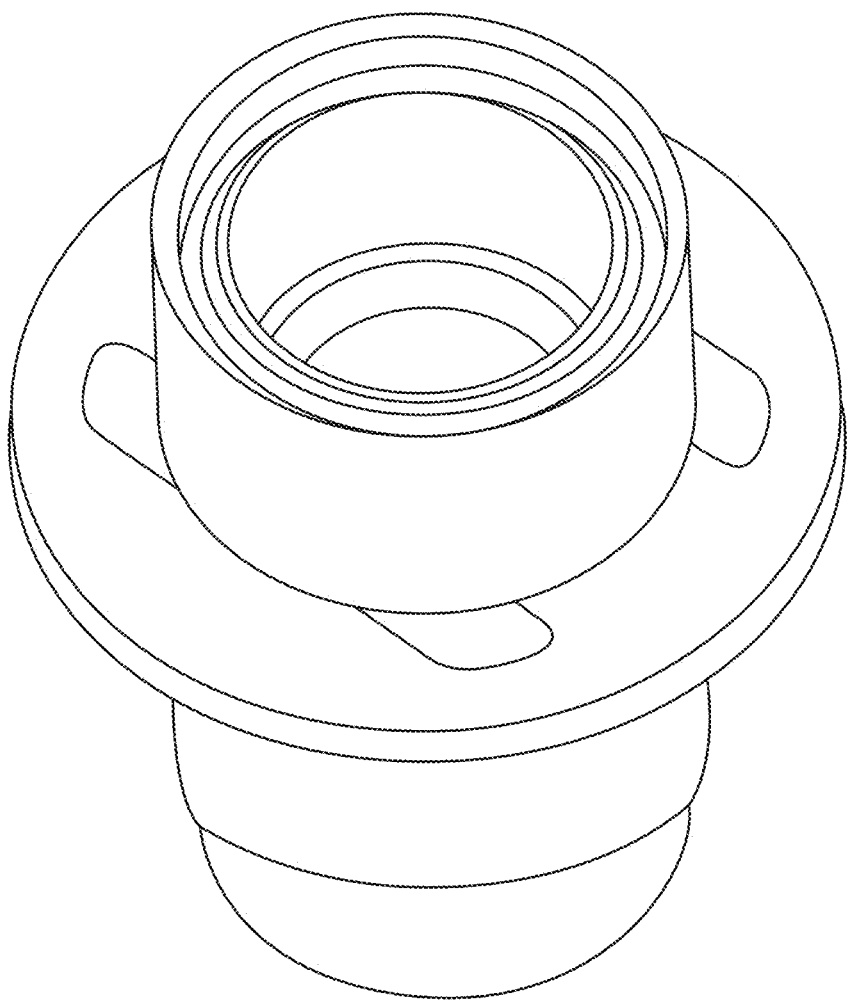
FIG. 4 is a perspective view of the lens holder of the present invention.
Figure 7:
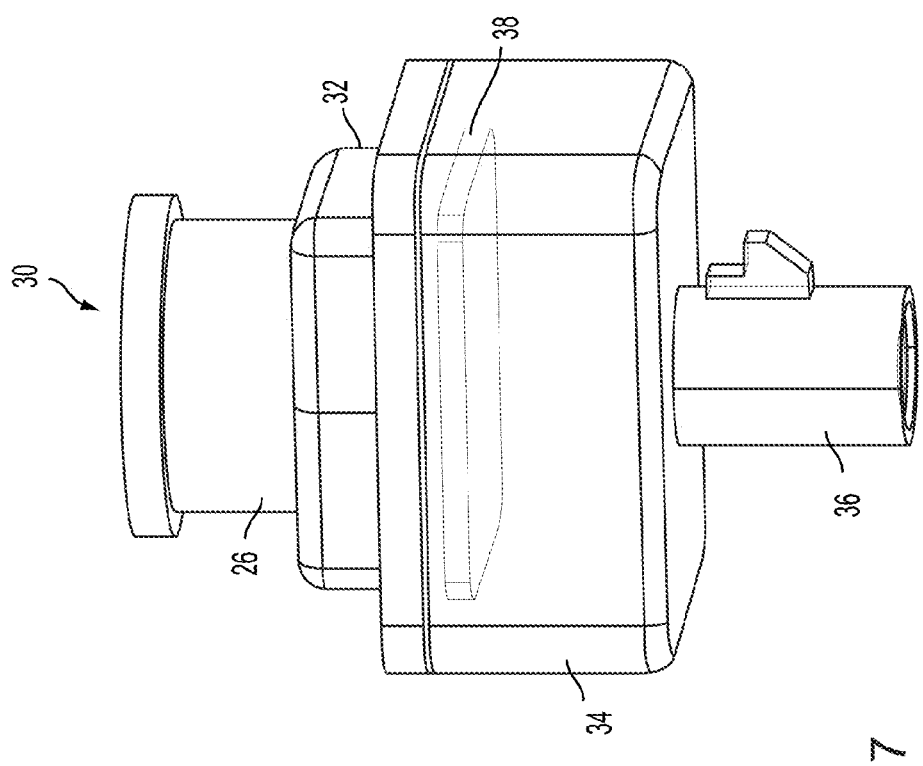
FIG. 7 is a perspective view of a camera having a lens holder in accordance with the present invention.

As shown in FIGS. 2 and 3, the camera or camera module 22 includes an imager 24 at an image plane and a lens holder or lens barrel 26 that holds the lens relative to the imager. During assembly of the camera module, the lens barrel is positioned relative to the imager's image plane to provide the desired focusing of images at the image plane by the lens. For example, the camera module 30 (FIG. 7) may include a front housing portion 32 and a rear housing portion 34, with the lens barrel 26 mounting at the front housing portion and with an electrical connector 36 (for connecting to a vehicle wiring harness or the like) provided at the rear housing portion. The front and/or rear housing portions support and house a circuit element or printed circuit board 38 therein, with the circuit element having the imager (and associated circuitry) disposed thereat. The lens barrel attaches or mounts to the front housing portion such that, when so attached, the lens may focus (or slightly blur) images at the image plane of the imager. For example, the flange of the lens barrel may engage corresponding structure at the front housing portion during the assembly process to locate the lens barrel and lens relative to the imager and image plane.

Figure 6:
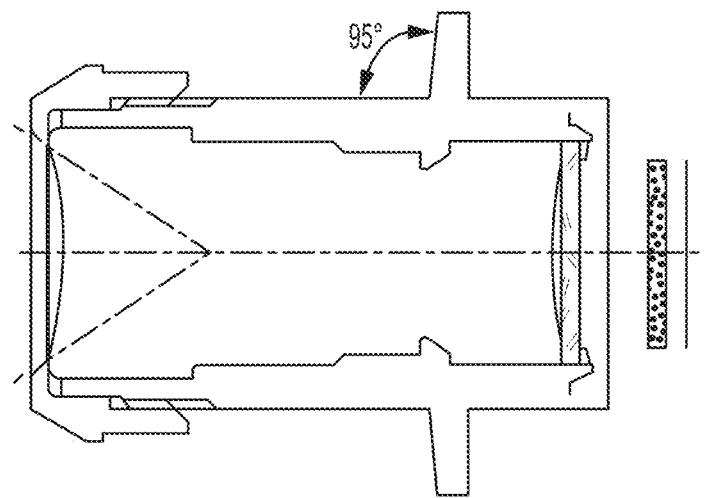
FIG. 6 is a sectional view of the lens holder of FIG. 5.
Figure 5:
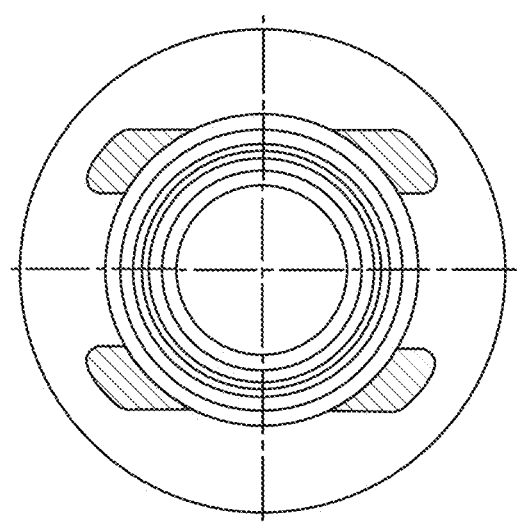
FIG. 5 is an end view of a lens holder of the present invention.

The plastic lens barrel is used widely in the camera industry for its low cost and easy mass production by plastic molding injection technology. One challenge for plastic lens barrel is to keep the flange focus length (FFL) consistent. The plastic injection molding process (for injection molding the plastic lens barrel) requires that the molding tooling to have a certain angle to ease the release of the part from the tooling after the part is molded. For example, and as can be seen in FIGS. 3 and 6, the flange surface 26b of the flange 26a is angled relative to a plane that bisects the lens barrel and has its normal axis or normal vector parallel to the axis of the lens barrel. For example, the flange surface 26b may be at about a five degree angle relative to such a plane.

This angled part or flange results in the flange surface not being made as a flat and uniform surface. That introduces large uncertainties for FFL. The FFL large tolerance will cause large camera focus variations during camera assembly.

The present invention provides a structure that keeps the lens Flange Focus Length (FFL) consistent for lens manufacturing, testing, and camera module assembly. The present invention provides a structure 28 on the lens barrel flange 26a to ensure a flat surface portion, while still forming the flange with its main surface having a small angle that meets the molding tooling release requirement (such as about a 5 degree angle from the plane that is perpendicular to the cylindrical body wall of the lens holder, such as shown in FIG. 6). The structure may be integrally molded with the lens barrel or holder during the injection molding process that molds and forms the lens holder.

As shown in FIGS. 2-6, the flat surfaces or structures or bosses 28 are established at the surface 26b of the flange 26a that faces the imager 24 when the lens barrel 26 is assembled at the imager and camera module. The planar flat surface resides in a plane that is normal to the axis of the lens barrel and thus, when the lens barrel is positioned relative to the imager for assembling the camera module, the plane of the planar flat surface is parallel to the image plane of the imager. As shown in FIGS. 3 and 6, when the lens barrel is positioned relative to the imager for assembling the camera module, the flat surface may be set at a predetermined FFL relative to the image plane, whereby the lens is positioned so as to substantially focus images at the image plane.

In the illustrated embodiment, the planar flat structure and surface is formed at the angled surface of the lens barrel flange so that the planar flat structure is angled relative to the angled surface. The planar flat surface or structure protrudes from the angled surface towards the imager in order to provide the planar or flat surface that faces and is parallel to the image plane. Although shown as a pair of flat structures extending partially along the angled surface of the barrel flange, the flat structure can be established as any suitable shape and at any suitable position at the barrel flange, so long as the flat structure is flat and provides a planar or flat surface that is normal to the axis of the lens barrel (in other words, the flat surface resides in a plane that is normal to the axis of the lens barrel and thus that is parallel to the image plane of the imager) so as to provide a uniform or consistent flat surface for establishing the proper FFL during camera assembly.

Optionally, the flat structure may be formed at or added to a different surface of the lens barrel, such as to a different flange or the like of the lens barrel, as long as the flat surface or structure is used to determine the camera focus length during assembly of the camera module.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication Nos. WO 2010/099416; WO 2011/028686; and/or WO 2013/016409, and/or U.S. Pat. Publication Nos. US-2013-0002873 and/or US 2010-0020170, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149, and/or U.S. Publication No. US-2006-0061008 and/or U.S. patent application Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO2012/075250; WO 2013/019795; WO 2012/075250; WO 2012/145822; WO 2013/081985; WO 2013/086249 and/or WO 2013/109869, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera assembly for a vision system of a vehicle, said camera assembly comprising:
    an imager disposed at a circuit element, said imager comprising a pixelated imaging array having a plurality of photosensing elements;
    a lens;
    a lens holder comprising a barrel portion that houses said lens;
    wherein said lens holder is positioned relative to an image plane of said imager;
    wherein said lens holder comprises a flange protruding outward from said barrel portion;
    wherein said flange comprises an angled surface portion that faces said image plane of said imager, and wherein said flange comprises a planar surface portion that protrudes from said angled surface portion;
    wherein said planar surface portion of said flange of said lens holder comprises a flat structure that has a planar surface that resides in a structure plane that is normal to an axis of said barrel portion; and
    wherein said lens holder is positioned relative to said image plane of said imager such that said planar surface of said planar surface portion is parallel to said image plane of said imager and such that said planar surface is a predetermined distance from said image plane, thereby positioning said lens at a predetermined location relative to said image plane of said imager.

2. The camera assembly of claim 1, wherein said angled surface portion of said flange of said lens holder has an angled surface that is angled relative to said structure plane of said planar surface of said planar surface portion.

3. The camera assembly of claim 2, wherein a portion of an angled surface of said angled surface portion is exposed and not encompassed by said planar surface portion.

4. The camera assembly of claim 1, wherein said flange comprises a circular-shaped flange protruding radially outward from the circular-shaped lens holder.

5. The camera assembly of claim 4, wherein said planar surface portion comprises a pair of strips having planar surfaces that extend at least partially across said circular-shaped flange.

6. The camera assembly of claim 5, wherein said circular-shaped flange has an angled surface that is angled relative to said structure plane of said planar surfaces, and wherein said strips are established at said angled surface portion and protrude from said angled surface portion of said generally circular-shaped flange.

7. The camera assembly of claim 1, wherein said planar surface portion comprises at least two flat structures having planar surfaces that extend at least partially across said flange.

8. The camera assembly of claim 7, wherein said angled surface portion of said flange of said lens holder has an angled surface that is angled relative to said structure plane of said planar surfaces, and wherein said flat structures are established at said angled surface and protrude from said angled surface portion of said flange.

9. The camera assembly of claim 8, wherein a portion of said angled surface is exposed and not encompassed by said flat structures.

10. The camera assembly of claim 1, wherein said lens holder is positioned relative to said image plane of said imager so that said lens focuses images at an image plane of said imager.

11. The camera assembly of claim 1, wherein said planar surface portion is integrally molded with said flange and said barrel portion via an injection molding process.

12. The camera assembly of claim 1, comprising a front housing portion and a rear housing portion, wherein said lens holder is attached at said front housing portion and wherein said imager and said circuit element are housed in said front and rear housing portions.

13. A camera assembly for a vision system of a vehicle, said camera assembly comprising:
 a front housing portion and a rear housing portion;
 an imager disposed at a circuit element housed in said front and rear housing portions, said imager comprising a pixelated imaging array having a plurality of photosensing elements;
 a lens;
 a lens holder comprising a barrel portion that houses said lens;
 wherein said lens holder is attached at said front housing portion;
 wherein said lens holder, when attached at said front housing portion, is positioned relative to an image plane of said imager;
 wherein said lens holder comprises a flange protruding outward from said barrel portion and wherein said flange has an angled surface portion having an angled surface that is angled relative to a structure plane that is normal to an axis of said barrel portion;
 wherein said flange of said lens holder includes a flat structure that is established at said angled surface portion and protrudes from said angled surface portion of said flange, and wherein said flat structure comprises a planar surface that resides in the structure plane that is normal to the axis of said barrel portion;
 wherein a portion of said angled surface portion is exposed and not encompassed by said generally flat structure; and
 wherein said lens holder is positioned relative to said image plane of said imager such that said structure plane is parallel to said image plane of said imager and such that said planar surface is a predetermined distance from said image plane, thereby positioning said lens at a predetermined location relative to said image plane of said imager.

14. The camera assembly of claim 13, wherein said flange comprises a circular-shaped flange protruding radially outward from the circular-shaped lens holder.

15. The camera assembly of claim 14, wherein said flat structure comprises a pair of strips having planar surfaces that extend at least partially across said circular-shaped flange.

16. The camera assembly of claim 13, wherein said lens holder is attached to said front housing portion and positioned relative to said image plane of said imager so that said lens focuses images at an image plane of said imager.

17. The camera assembly of claim 13, wherein said flat structure is integrally molded with said flange and said barrel portion via an injection molding process.

18. A camera assembly for a vision system of a vehicle, said camera assembly comprising:
 a front housing portion and a rear housing portion;
 an imager disposed at a circuit element housed in said front and rear housing portions, said imager comprising a pixelated imaging array having a plurality of photosensing elements;
 a lens;
 a lens holder comprising a barrel portion that houses said lens;
 wherein said lens holder is attached at said front housing portion;
 wherein said lens holder, when attached at said front housing portion, is positioned relative to an image plane of said imager;
 wherein said lens holder comprises a flange protruding radially outward from said barrel portion, and wherein said flange has an angled surface portion that has an angled surface that is angled relative to a structure plane that is normal to an axis of said barrel portion;
 wherein said flange of said lens holder includes flat structures that are established at said angled surface portion and protrude from said angled surface portion of said flange, and wherein said flat structures comprise at least two spaced apart structures having planar surfaces that reside in the structure plane that is normal to the axis of said barrel portion, and wherein said angled surface of said angled surface portion is exposed and not encompassed by said flat structures; and
 wherein said lens holder is positioned relative to said image plane of said imager such that said structure plane is parallel to said image plane of said imager and such that said planar surfaces are a predetermined distance from said image plane, thereby positioning said lens at a predetermined location relative to said image plane of said imager.

19. The camera assembly of claim 18, wherein said lens holder is positioned relative to said image plane of said imager so that said lens focuses images at an image plane of said imager.

20. The camera assembly of claim 18, wherein said flat structures are integrally molded with said flange and said barrel portion via an injection molding process.

* * * * *